Aug. 3, 1965  E. A. RAGER ETAL  3,198,086
EMERGENCY AIR BRAKE ACTUATING MECHANISM FOR TRUCK TRAILERS
Filed Sept. 4, 1962  2 Sheets-Sheet 1
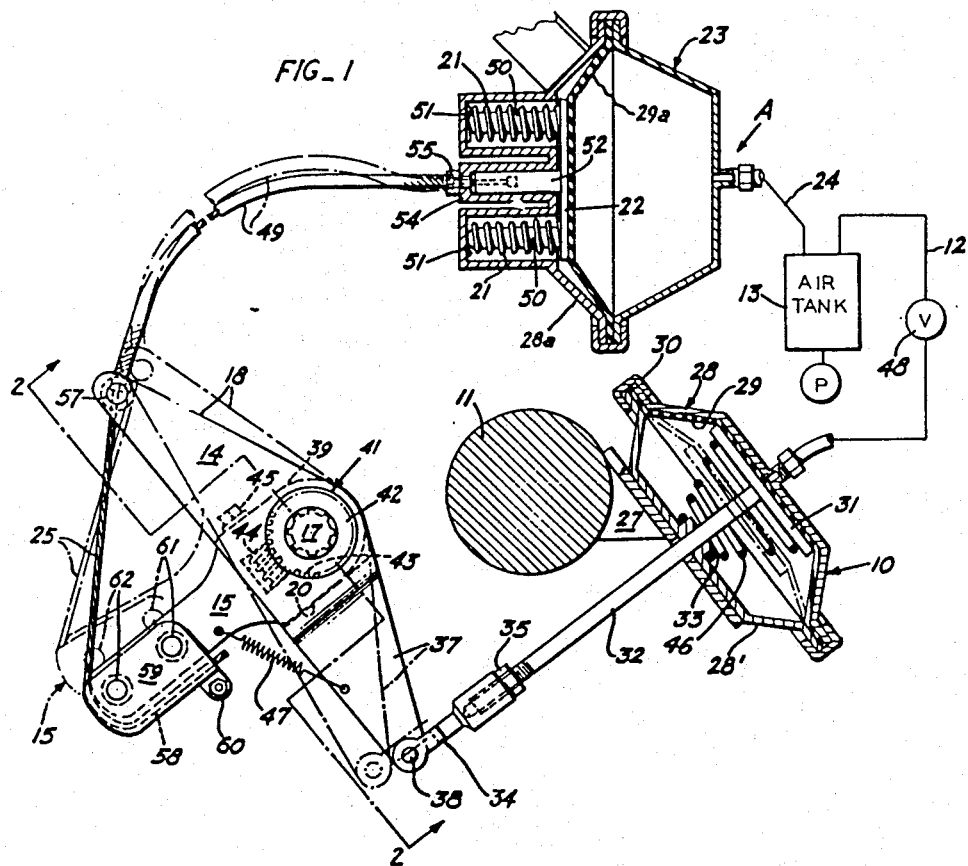
FIG_1
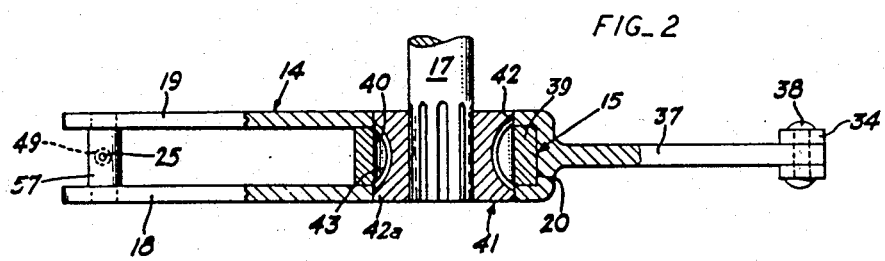
FIG_2
INVENTORS
EDGAR A. RAGER
WILLIE T. DAVIS
FRANKLIN F. DAY
BY Hansen and Lane
ATTORNEYS

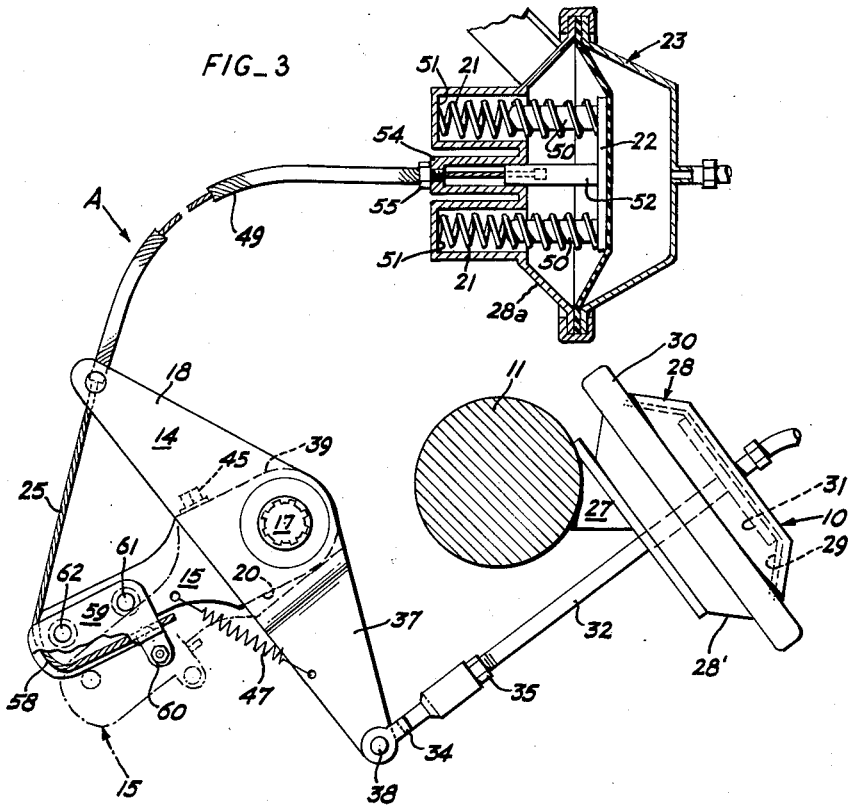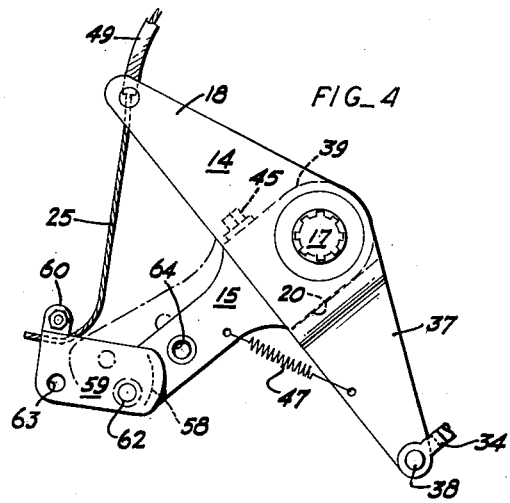

United States Patent Office 3,198,086
Patented Aug. 3, 1965

3,198,086
EMERGENCY AIR BRAKE ACTUATING MECHANISM FOR TRUCK TRAILERS
Edgar A. Rager and Willie T. Davis, San Jose, and Franklin F. Day, Saratoga, Calif.; said Rager and said Davis, assignors, by direct and mesne assignments, to Neway Equipment Company, Muskegon, Mich., a corporation of Michigan
Filed Sept. 4, 1962, Ser. No. 221,077
3 Claims. (Cl. 91—170)

The present invention relates to brakes, and pertains more particularly to an emergency brake mechanism for truck trailers having air brakes.

With the tremendous amount of freight tonnage which is now hauled in large truck trailers on the highways of the United States, the problem of arresting these vehicles in the event of failure of the ordinary braking system thereof has assumed the stature of a national problem. Every year many of these truck trailer rigs are involved in accidents due to failure or partial failure of their braking systems, and the lack of an adequate emergency braking system. The realization of the problem involved here has, as is always the case in such situations, produced many attempts to solve the problem. Most of these attempted solutions however merely provide means for actuating the brakes within the limits of movement imposed by the normal braking system of the vehicle. Such limited actuation of the brakes frequently is not sufficient to provide for adequate braking under emergency conditions.

The joint inventors of the present invention have previously invented and patented an emergency brake mechanism, Patent No. 2,963,119, for emergency operation of a brake cam shaft beyond its limit of movement by means of the normal braking system.

The present invention provides an improved, emergency brake actuating mechanism for the air brake system of a truck-trailer.

A further object of the invention is to provide an emergency braking mechanism for use with the air brake system of a truck-trailer, whereby a first brake actuating member is operatively connected to the brake actuating cam of an air brake system for normal operation of the brakes, and a second, emergency brake actuating member, is powerfully biased toward a brake setting position, but is maintained in inoperative condition by the existence of operative air pressure within the air brake system, and is released by the loss of such air pressure to thereby operate the brake actuating cam beyond its normal limit of movement.

A further object of the invention is to provide emergency braking mechanism for an air brake system having a brake actuating member, an air pressure actuated member operatively connected to the brake actuating member for normal braking operation thereof, a spring biased member urging the brake actuating member in a brake setting direction, and air pressure actuated mechanism counteracting the spring biased member, and which releases the spring biased member to emergency brake setting condition upon loss of air pressure within the air brake system.

These, and other objects and advantages of the invention, will be apparent from the following description and the accompanying drawings, wherein:

FIG. 1 is a somewhat diagrammatic, sectional view through an emergency brake actuating mechanism embodying the present invention, the solid lines showing the parts in brake releasing position, and the broken lines showing the parts in their normal brake setting position.

FIG. 2 is a sectional view taken along line 2—2 of FIG. 1.

FIG. 3 is a view similar to FIG. 1, but showing the parts in their emergency actuated condition in solid lines, the brake lever being shown in its normal, brake releasing position in broken lines.

FIG. 4 is a view similar to the lower left hand portion of FIGS. 1 and 3, but showing a cable tension release clip swung to cable releasing condition after an emergency setting of the brakes.

Briefly, the illustrated form A of the invention comprises a primary air actuated cylinder or "pot" 10 of a type commonly employed for actuating the air brakes of a truck-trailer vehicle of the type for which the present invention is intended. The pot 10 is one of a usual pair thereof which are mounted on an axle 11 of such vehicle, and is connected by an air line 12 through a driver-controlled valve 48 to a usual compressed air tank 13, also mounted on the vehicle.

The primary pot 10 actuates a bifurcated lever 14 from its solid to its broken line position of FIG. 1 for normal brake operation. A brake arm 15, which is generally similar to the usual slack adjuster arm of such air brake systems, is splined to a conventional brake actuating cam shaft 17. The brake arm 15 rides between the legs 18 and 19 of the bifurcated lever 14, and when the latter lever is swung clockwise from its solid to its broken line position of FIG. 1, the bifurcated arm 14 bears against the flat side 20 of the brake arm 15 and swings the latter toward its normal brake setting position shown in broken lines in FIG. 1.

A plurality of powerful compression coil springs 21 urge the piston 22 of a deeper secondary pot 23 toward its emergency brake actuating position of FIG. 3. However, when compressed air at brake operating pressure is present in the tank 13, such air enters the second pot 23 through an open, high pressure air line 24 and moves the secondary pot piston 22 to compress the springs 21, thereby releasing an emergency actuating cable 25 to its slack condition of FIG. 1. In the latter condition of the cable 25, normal operation of the brakes is provided by actuation of the primary air pot 10.

Upon loss of operating air pressure from the air tank 13, and thereby from the secondary pot 23 which is in open communication therewith, the piston 22 of the secondary air pot is urged by the springs 21 to its position of FIG. 3, thereby drawing the cable 25 and the brake arm 15 to which it is connected to their solid line, emergency brake setting positions of FIG. 3. The secondary pot 23 preferably is sufficiently deeper than the primary pot 10, to be able to swing the brake arm 15 well beyond its limit of movement by means of the primary pot 10.

Referring to the drawings in greater detail, the primary air pot 10 is fixedly mounted on the trailer axle 11 by a bracket 27, and comprises a usual casing 28 of two circular, pan-shaped half portions with a rubber diaphragm 29 gripped marginally therebetween, and secured together by a surrounding channel member 30.

A usual piston disk 31 is mounted centrally of the diaphragm 29, so that when compressed air is introduced into the right hand side of the primary pot casing 28 as illustrated in FIGS. 1 and 3, the piston 31, sealed by the diaphragm 29, will be driven toward the left as shown in dot-dash lines in FIG. 1

A piston rod 32, secured co-axially to the piston 31, passes through a hole provided therefor in a boss 33 centrally of a left hand casing member 28'. A socketed yoke member 34 is screwed onto the threaded outer end of the piston rod 32, and is secured in axially adjusted position thereon by a lock nut 35. The yoke end member 34 is pivotally connected to the outer end of a single arm portion 37 of the bifurcated lever 14 by a pivot pin 38.

The bifurcated leg portions 18 and 19 of the lever 14 (FIG. 2), are preferably parallel, and are separated by a distance sufficient to receive the hub portion 39 of the brake arm 15 therebetween.

The brake arm hub portion 39 is provided with an opening 40 therein (FIG. 2) which has bearing support on a worm gear 41. The latter is splined onto one end of the brake actuating cam shaft 17, and the usual brake actuating cam (not shown) is secured to the other end of the cam shaft. The worm gear 41 has cylindrical end portions 42 and 42a (FIG. 2) on opposite sides of the gear teeth 43 therein, and these end portions are journaled in aligned openings provided therefor in the legs 18 and 19 of the bifurcated lever 14. A worm pinion 44 (FIG. 1), of the type commonly employed in slack adjuster arms of the general type illustrated, has journal support in the brake arm 15, and is in driving, meshed engagement with the worm gear 41.

A hexagonal head portion 45 (FIGS. 1, 3 and 4) is provided on the worm pinion 44, so that by means of a conventional wrench (not shown) the pinion may be rotated in a desired direction to thereby adjust the angular position of the brake arm 15 relative to the cam shaft 17. This slack adjusting mechanism and its method of operation is well known to those familiar with air brakes for truck-trailers so that it will not be necessary to explain it in greater detail herein.

The hub portion 39 of the brake arm 15 is rounded concentrically with the opening 40 therein for the worm gear 41 to permit limited clockwise rotative movement of the brake arm 15 relative to the bifurcated lever 14 from the relative positions thereof shown in solid lines in FIGS. 1 and 4 and in broken lines in FIG. 3. Relative rotative movement of the brake arm 15 and the bifurcated lever 14 in the opposite direction from such relative positions, however, is prevented by the engagement of the flat side 20 of the brake arm 15 with the bifurcated lever 14 between the legs 18 and 19 thereof. Therefore, when the parts are in such relative positions rotative movement of the bifurcated lever 14 in a clockwise direction from its solid line position of FIG. 1 carries the brake arm 15 with it, as shown for example in the dot-dash lines of FIG. 1. The usual brake retracting springs of the brake bands (not shown) with which the present mechanism is to be used urge the cam shaft 17 and with it the brake arm 15 and bifurcated lever 14 and their associated parts toward their normal, solid line conditions of FIG. 1. A coil spring 47 mounted in tension between the brake arm 15 and bifurcated lever 14 urges the brake arm 15 toward its position of seated engagement with the bifurcated lever 14 as shown in FIG. 1.

Normal operation of the brakes (not shown) with which the illustrated mechanism is to be used is accomplished by admitting compressed air from the tank 13 through the high pressure air line 12 to the primary pot 10 by means of a usual, driver-controlled brake valve 48. There the compressed air moves the pot piston 31, piston rod 32, bifurcated lever 14 and brake arm 15 toward their dot-dash line positions of FIG. 1, thereby turning the cam shaft 17 to brake setting position. During this normal brake setting operation the emergency brake actuating cable 25 and a flexible compression housing 49 through which the cable is inserted flex to their dot-dash line position of FIG. 1 without changing their relative positions longitudinally of each other.

Emergency actuation of the brake actuating mechanism A results from a reduction of air pressure in the secondary air pot 23, which is in open communication with the air tank 13 through the high pressure air line 24. The secondary air pot 23 is generally similar to the primary air pot 10, but is deeper than the latter so as to provide for a longer piston travel. Since the piston and diaphragm of the secondary air pot 23 correspond generally to those of the primary air pot 10, they are designated by corresponding reference numerals with the suffix "a" added.

A plurality of guide pins 50 are affixed to the piston 22 of the secondary pot, and a powerful compression spring 21 surrounds each of these pins. The springs 21 are held in compression between the piston 22 and the ends of individual housing cups 51, formed integrally with the casing 28a, and enclosing each of the springs 21. The springs 21 normally bias the piston 22 powerfully toward its emergency brake setting position of FIG. 3, but when operating air pressure is present in the air tank 13, and therefore within the secondary air pot 23, the secondary pot piston 22 is driven thereby, against the bias of its powerful springs 21, to its brake releasing position shown in FIG. 1.

A center post 52 is integrally secured to the piston 22 of the secondary air pot 23, and rides in a central tubular portion 54 of the casing 28a. One end of the emergency actuating cable 25 is firmly anchored co-axially to the outer end of the center post 52, and is inserted through the flexible compression housing 49. One end of the cable housing 49 is threadedly connected at 55 to the central casing portion 54, while the other end of the cable housing 49 is in endwise, abutting engagement with a thrust member 57, which is pivotally mounted transversely between the free ends of the legs 18 and 19 of the bifurcated lever 14.

The cable 25 passes through a hole provided therefor in the pivoted thrust member 57, and is fitted into a groove 58 provided therefor around the outer end of a cable release clip 59 on the free end of the brake arm 15. The terminal portion of the cable 25 is firmly gripped by clamp means 60 on the cable release clip 59.

The cable release clip 59 is normally fixedly secured to the free end of the brake arm 15 by a pair of through pins 61 and 62, inserted through holes 63 provided therefor in the release clip 59, and corresponding holes 64 in the brake arm 15. When the innermost pin 61 is removed, however, the clip 59 is free to swing pivotally outwardly about the outer pin 62 to its cable releasing position shown in FIG. 4.

The operation of the illustrated form of the invention is as follows: When air at operating pressure is present in the air tank 13, such air is transmitted through the open air line 24 to the interior of the secondary pot casing 28a and moves the piston 22 therein to its cable releasing position of FIG. 1, thereby compressing the powerful coil springs 21. In this condition of the secondary air pot 23, normal operation of the brakes is accomplished by means of the driver controlled air valve 48. When the latter valve, which is self venting, is closed, the usual brake releasing spring 46 (FIG. 1) urge the parts to their unactuated, brake releasing, solid line positions of FIG. 1.

When air is admitted to the primary air pot 10 by the driver opening the valve 48, the primary air pot piston is moved thereby to its dot-dash line position of FIG. 1, thereby swinging the bifurcated lever 14 to its dot-dash line position of FIG. 1. This action swings the brake arm 15, and with it the worm gear 41 and brake cam shaft 17, in a clockwise direction toward their dotted line positions of FIG. 1 to set the brakes.

Upon closing the self venting, driver actuated valve 48, the pressurized air is vented from the primary air pot 10, thereby permitting the usual brake release spring 46 (FIG. 1) to return the parts to their normal, solid line, brake releasing position of FIG. 1.

In the event of loss of air pressure in the air tank 13, pressurized air is released from the casing 28a of the secondary air pot 23 through the open air line 24. This action allows the powerful springs 21 to urge the piston 22, and with it the cable-connected center post 52, toward their emergency, brake-actuating positions shown in FIG. 3. As the springs thus exert their powerful pull on the cable 25, the flexible compression housing 49 retains the portion of the cable enclosed therein against lateral displacement in the well known manner of a Bowden wire control. The powerful tension thus exerted draws the flexible housing toward the right, thereby swinging the brake arm 15, and with it the brake cam shaft 17, in a clockwise direction toward their emergency actuating positions shown in solid lines in FIG. 3, the compression housing 49 retaining the bifurcated lever 14 in its normal, solid line position of FIG. 3.

Due to the added depth of the secondary air pot 23 referred to previously herein, the emergency brake actuating movement of the brake arm 15 by the secondary pot can continue well beyond the limit of movement of the brake arm by means of the primary air pot 10. This is very important, since in the event that the brake drums should become expanded by friction-generated heat on a long down grade, and such expansion should cause a "fading" of the brakes, in the absence of emergency equipment capable of setting the brakes beyond their normal braking condition might well result in a runaway with possibly tragic consequences.

The emergency actuated condition of the brakes as illustrated in FIG. 3 is already beyond their normal actuated condition as shown in FIG. 1, but, as is apparent in this figure, the emergency mechanism is capable of moving the brake arm 15 considerably further, if necessary, before the piston 22 bottoms in the secondary pot 23 under the action of the coil springs 21.

In the event that it should be necessary to tow a disabled truck-trailer upon which the mechanism A is mounted, and without air pressure in the air tank 13 after an emergency actuation of the brakes, the brakes can be released by slackening the cable 25, by tripping the cable release means. In the illustrated form of the invention this is accomplished by removing the inner pin 61 which holds the clip 59 on the brake arm 15. This removal of the pin 61 allows the clip 59 to swing about the outer pin 62 as a pivot to its cable releasing condition of FIG. 4. This action provides sufficient slack in the cable 24 to permit the coil spring 47 and the usual brake band springs, not shown, to return the brake arm 15 to its normal, brake releasing position shown in solid lines in FIG. 4. The release clip 59 is of sufficient length to permit this full release of the brake arm 15, even when the piston 22 of the secondary pot 23 is bottomed by the force of the springs 21.

The invention provides a simple, positive acting and inexpensive emergency brake actuating mechanism. It is capable of swinging the brake arm well beyond the maximum limit of operation thereof by the normal brake actuating mechanism of the truck-trailer upon which it is mounted and since the mechanism employs component parts of a type well known to those familiar with air brake mechanisms of this general nature it will be capable of being serviced by ordinary truck mechanics without the necessity of extended special instructions.

While we have illustrated and described a preferred embodiment of the present invention, it will be understood, however, that various changes and modifications may be made in the details thereof without departing from the scope of the invention as set forth in the appended claims.

Having thus described the invention, what we claim as new and desire to protect by Letters Patent is defined in the following claims:

1. Mechanical actuating means for emergency operation of a truck trailer type air brake system comprising
   a lever journaled on a brake actuating shaft of such system and adjacent a brake arm of such system secured to such shaft,
   a portion of the lever formed and positioned to operatively engage and move such brake arm toward brake setting position upon journal movement of the lever in one direction, and to swing free of operative engagement with such brake arm upon journal movement of the lever in the opposite direction,
   means operatively connecting a free end of the lever to a primary air pot of such system for journal movement of the lever and its brake arm engaging portion in said one direction to brake setting position within normal limits upon actuation of such primary air pot,
   an emergency air pot communicating with a compressed air supply of such system to be pressurized and held in actuated position when such system is pressurized to brake operating condition,
   biasing means opposing air actuation of the emergency air pot, said biasing means being powerful enough for emergency actuation of such brake system, and less powerful than the emergency air pot when the latter is pressurized by compressed air from such system at brake operating pressure, and
   tension transmitting means operatively interconnecting the biasing means with such brake arm, said tension transmitting means being slackened by actuation of the emergency air pot by pressurization thereof at brake operating pressure, and being tensioned by the biasing means upon loss of pressurization by the emergency air pot to move such brake arm away from operative engagement with the lever portion to emergency brake setting position beyond its said normal limits of operation.

2. An arrangement according to claim 1 wherein the means interconnecting the brake arm with the biasing means is a flexible cable.

3. Mechanical actuating means for emergency operation of a truck trailer type air brake system comprising
   a lever comprising a bifurcated portion and an unbifurcated portion, the bifurcated portion being journaled on a brake actuating shaft of such system, and with a brake arm of such system within the bifurcated portion,
   the base of the bifurcated lever portion formed and positioned to operatively engage and move such brake arm toward brake setting position upon journal movement of the lever in one direction, and to swing free of operative engagement with such brake arm upon journal movement of the lever in the opposite direction,
   means operatively connecting a free end of the lever to a primary air pot of such system for journal movement of the lever and its brake arm engaging portion in said one direction to brake setting position within normal limits upon actuation of such primary air pot,
   a cable housing thrust member on the other end of the lever,
   a flexible compression cable housing in endwise compression at one end thereof with the thrust member and at the other end thereof with a reaction element,
   an emergency air pot communicating with a compressed air supply of such system to be pressurized and held in actuated position when such system is pressurized to brake operating condition,
   biasing means opposing air actuation of the emergency air pot, said biasing means being powerful enough for emergency actuation of such brake system, and less powerful than the emergency air pot when the latter is pressurized by compressed air from such system at brake operating pressure, and
   a tension transmitting cable operatively interconnecting the biasing means with such brake arm and extending through the cable housing, said cable being slackened to permit curving of the cable housing by actuation of the emergency air pot by pressurization thereof at brake operating pressure, and being tensioned by the biasing means upon loss of pressurization by the emergency air pot to move such brake arm away from operative engagement with the base of the bifurcated lever portion to emergency brake setting position beyond its said normal limits of operation, and simultaneously to straighten the cable housing to urge the lever in said opposite direction.

References Cited by the Examiner

UNITED STATES PATENTS

| | | | |
|---|---|---|---|
| 2,056,223 | 10/36 | Stout et al. | 303—6 |
| 2,261,530 | 11/41 | Strickler | 74—480 |
| 2,409,908 | 10/46 | Simpkins | 303—9 |
| 2,572,404 | 10/51 | Stoltenberg | 74—480 |
| 2,963,119 | 12/60 | Roger et al. | 188—106 |
| 3,011,834 | 12/61 | Casey | 188—170 |
| 3,090,652 | 5/63 | Hovell | 303—9 |

FRED E. ENGELTHALER, *Primary Examiner.*

SAMUEL LEVINE, *Examiner.*